United States Patent [19]
Jenkins

[11] 3,951,341
[45] Apr. 20, 1976

[54] IRRIGATION VEHICLE

[76] Inventor: Elton E. Jenkins, 416 N. 10th St., Geneva, Nebr. 68361

[22] Filed: May 7, 1975

[21] Appl. No.: 575,350

[52] U.S. Cl. .............................. 239/212; 239/286; 137/344; 222/178
[51] Int. Cl.² .................... B05B 15/06; A01G 25/02
[58] Field of Search .......... 239/177, 178, 189, 159, 239/195, 197, 212, 286, 287; 137/344; 222/176, 178

[56] References Cited
UNITED STATES PATENTS

| | | | |
|---|---|---|---|
| 1,526,642 | 2/1925 | Nissley | 239/286 X |
| 2,628,863 | 2/1953 | Maggart | 239/212 |
| 2,860,007 | 11/1958 | Cornelius | 137/344 |
| 3,423,027 | 1/1969 | Small et al. | 239/287 |
| 3,526,364 | 9/1970 | Hattis | 239/212 |
| 3,592,220 | 7/1971 | Reinke | 239/212 X |

FOREIGN PATENTS OR APPLICATIONS
824,514  10/1969  Canada ............................. 239/178

*Primary Examiner*—Robert S. Ward, Jr.

[57] ABSTRACT

A motorized tubular frame four wheel irrigation vehicle adapted to straddle a row of crops without causing damage to the row, the vehicle having swivel wheels at the back end thereof and carrying a horizontal carrying bar across the top front end thereof with the carrying bar having yokes swivelly mounted therealong and adapted to carry a length of irrigation piping rested in a horizontal position and with such irrigation piping having a row of longitudinally aligned and spaced apart sprinkling openings disposed therein and positioned so as to only sprinkle towards the rear of the vehicle to avoid forming mud at the front drive wheels of the vehicle.

5 Claims, 5 Drawing Figures

U.S. Patent  April 20, 1976  3,951,341
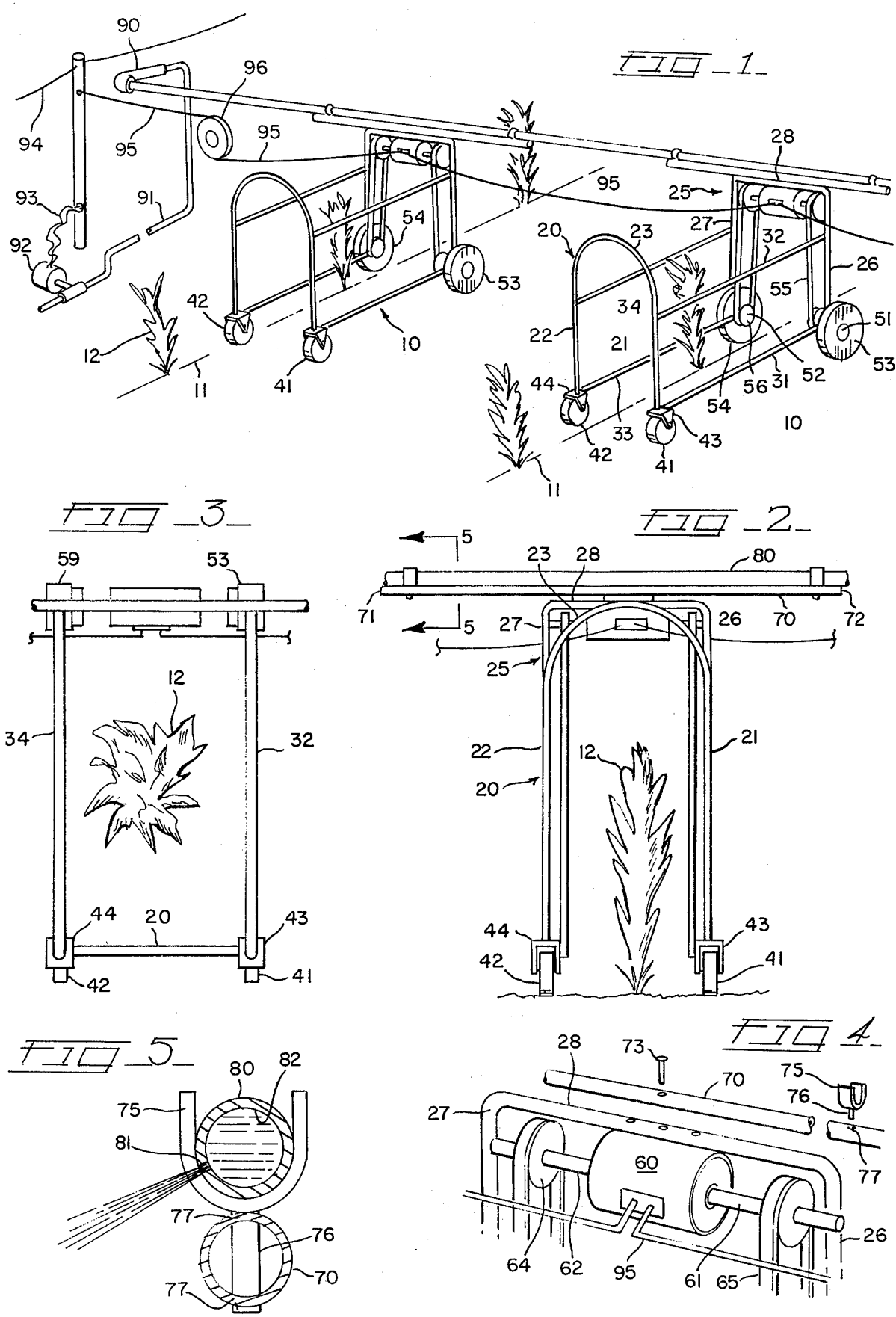

IRRIGATION VEHICLE

BACKGROUND OF THE INVENTION

1. Field of the Invention

This invention relates generally to irrigation devices and more particularly to a novel and improved irrigation vehicle intended for use in carrying an irrigation piping across rows of crops without damaging the crops and to provide water irrigation to the crops, the vehicle being used either individually or in combination with other identical vehicles disposed in side-by-side relationship therewith.

2. Description of the Prior Art

The provision of adequate watering to rows of crops to facilitate the growth thereof has long been acknowledged by farmers and others familiar with the cultivation of crop growing land. One of the problems of such irrigation is the present need for installing permanent sprinklers, pipe lines, and the like over many hundreds of acres of crop land to provide irrigation thereto, this being excessively expensive so as to place it out of reach of the majority of farmers. Such farmers must thus continue growing crops with the risk of insufficient rain damaging the crop growth, this discouraging many farmers who eventually abandon their land in favor of other occupations.

SUMMARY OF THE INVENTION

The present invention provides a novel solution to the irrigation of rows of crops by providing a novel irrigation vehicle which may be used individually or with a multitude of such vehicles in side-by-side relationship, the vehicles being motorized to carry a length of irrigation piping along a row of crops to sprinkle the crops in a manner not affecting the movement of the vehicle such that a farmer may utilize the vehicles for mobile irrigation of a large number of fields without having to invest in permanently installed pipe systems and the associated high initial cost thereof as well as the high level of regular maintenance required therefor.

It is a feature of the present invention to provide an irrigation vehicle.

A further feature of the present invention provides an irrigation vehicle which is relatively simple in its construction and which therefore may be readily manufactured at a relatively low cost and by simple manufacturing methods so as to enable it to be retailed to farmers and other interested individuals at a sufficiently low price to encourage widespread use thereof as compared to permanently installed irrigation systems.

Still a further feature of the present invention provides an irrigation vehicle which is of a rugged and durable construction and which therefore may be guaranteed by the manufacturer to withstand many years of intended usage.

Yet still a further feature of the present invention provides an irrigation vehicle which is easy to use and reliable and efficient in operation.

Other features and advantages of this invention will be apparent during the course of the following description.

BRIEF DESCRIPTION OF THE DRAWINGS

In the accompanying drawings forming a part of this specification, and in which like reference characters are employed to designate like parts throughout the same:

FIG. 1 is a perspective view of a pair of the irrigation vehicles of the invention disposed in side-by-side relationship and carrying an irrigation pipe transversely of rows of crops;

FIG. 2 is a back elevational view of the irrigation vehicle of the invention;

FIG. 3 is a top plan view of the irrigation vehicle;

FIG. 4 is a fragmentary exploded perspective view of the top of the front end portion of the irrigation vehicle; and FIG. 5 is an enlarged cross-section view taken along line 5—5 of FIG. 2.

DESCRIPTION OF THE PREFERRED EMBODIMENT

Referring now to the drawings in detail there is illustrated a preferred form of an irrigation vehicle constructed in accordance with the principles of the present invention and which is designated generally in its entirety by the reference numeral 10 and which, for purposes of illustration, is illustrated at straddling a row 11 of crops to illustrate how such vehicles straddle such rows without interfering or causing any damage to the row of crops.

The irrigation vehicle 10 is formed of a tubular frame having a back end 20 formed of a single length of tubular material bent over onto itself to define an inverted U-shape having vertical upright portions 21 and 22 interconnected at their top portions by arched portion 23. The front end 25 is similarly formed of tubular members in a generally inverted U-shaped configuration having squared off corners and including vertical upright portions 26 and 27 interconnected at their top end portions by horizontal top member 28. Interconnecting upright 21 to upright 26 are a pair of vertically spaced apart horizontally extending side frame members 31 and 32. Similarly, interconnecting upright portion 22 to upright portion 27 are a pair of vertically spaced apart horizontally extending side frame members 33 and 34.

Connected to the bottom ends of uprights 21 and 22 are a pair of rear wheels 41 and 42 each mounted between the leg portions of an inverted U-shaped brackets 43 and 44 respectively and with the bight portions of each bracket being swivelly connected to the bottom ends of the uprights 21 and 22 respectively so as to be capable of swivelling type movement relative thereto.

A pair of axially aligned spaced apart shafts 51 and 52 are each associated with uprights 26 and 27 respectively and extend outwardly from opposite ends thereof normal to the plane of side frame members 31–34 with the outer end of each shaft having fixedly mounted thereto one of the front wheels 53 and 54, and with the inner end of each shaft having mounted thereon a pulley wheel 55 and 56. The shafts 51 and 52 are journaled for rotation relative to the uprights 26 and 27.

Affixed centrally of horizontal top member 28 beneath the same is an electric motor 60 having a pair of axially aligned shafts 61 and 62 extending outwardly from opposite ends thereof with their ends being rotatively journaled in uprights 26 and 27 respectively. A pulley 63 is affixed concentrically to shaft 61 and extends radially relative thereto, with a similar pulley 64 being affixed centrally of shaft 62 concentric therewith and extending radially relative thereto.

A pair of resilient drive belts 65, 65 are provided with one of the drive belts being trained over vertically aligned pulleys 63 and 55 to drivingly connect pulley 55 to 63, and with the other drive belt 65 being trained over vertically aligned pulleys 64 and 56 to rotatively drive pulley 56 from pulley 64. In this manner motor 60 is drivingly connected to the front wheels 53 and 54 to propel the vehicle 10 forwardly of the row 11 of crops 12 with the wheels straddling the row of crops and with the top members 28 and 23 being of sufficient height not to interfere or damage the growth of crop 12.

Affixed to top member 28 and extending horizontally outwardly past each of the uprights 26 and 27 is a horizontal tubular shaped carrying bar 70 having outer ends 71 and 72 and which is mounted to top member 28 at its midpoint by bolts 73. Disposed at each of the ends 71 and 72 of the carrying bar and spaced slightly inwardly therefrom are identical yoke members 75, 75 which are each swivelly connected to the carrying bar by means of a stem 76 extending downwardly from the bight portion of each of the yokes and being rotatively received in associated cylindrical aperture 77 in the carrying bar.

A length of hollow tubular shaped water pipe 80 is provided of a diameter to be received between the yoke 75 and carried thereby, with the water pipe having a longitudinally aligned and spaced apart series of apertures 81 extending therethrough in communication with the interior 82 of the water pipe to provide nozzle-like openings for spraying irrigating water from the pipe onto the crops. In this regard the pipes 80 are positioned in the yoke 75 such that the nozzels 81 are directed at an incline rearwardly of the vehicle 10 so as to avoid placing water on the row of crops in the position of the vehicle front wheels 53 and 54, this assuring positive forward movement of the vehicle as there is no mud in the field so that the wheels 53 and 54 always have a firm gripping on the ground and will not bog down in mud or the like.

One end of the pipe 80 is closed with the opposite end of the pipe adapted to be connected by a flexible hose like coupling 90 to a flexible pipe 91 having a water pump 92 associated therewith for driving water through the pipe 80 to irrigate the field. The pump 92 is electrically connected by wires 93 to a suitable source of electrical power 94.

The motor 60 is connected by a length of suitably insulated electrical wiring 95 which is wrapped about a spring loaded take-up reel 96 and then connected to a suitable source of electric power 94.

As seen in FIG. 1, it is envisioned that a multitude of vehicles 10 may be used in side-by-side relationship to carry connected lengths of water pipe 80 with the motors 60 being connected in electric parallel relationship from power source 94 so that an entire field consisting of many rows of crops may be irrigated simultaneously, it being understood that the length of the supply tubing 91 and coupling 90 is sufficient for whatever distance the vehicles 10 are to travel along the rows 11.

It is to be understood that the form of this invention herewith shown and described is to be taken as a preferred example of the same, and that this invention is not to be limited to the exact arrangement of parts shown in the accompanying drawings or described in this specification as various changes in the details of construction as to shape, size, and arrangement of parts may be resorted to without departing from the spirit of the invention, the scope of the novel concepts thereof, or the scope of the sub-joined claims.

Having thus described the invention, what is claimed is:

1. An irrigation vehicle intended for straddling a row of crops and to travel therealong in a manner not damaging or interfering with the crops, the vehicle comprising, in combination:
   a supporting frame having a front end and a back end;
   a pair of wheels affixed to said back end for swivelling type movement relative thereto;
   a pair of wheels affixed to said front end and projecting outwardly therefrom journaled for rotation in said frame;
   an electric motor affixed to said front end of said frame;
   means drivingly connecting said motor to said front wheels to effect driving rotation thereof;
   a carrying bar member affixed to said front end and extending outwardly therefrom in a direction transverse of said frame to extend normal to the axis of a row of crops when said vehicle straddles the same;
   A pair of water pipe carrying yokes swivelly connected to opposite ends of said carrying bars adapted to carry a water pipe in a horizontal position therebetween and
   said water pipe having a series of longitudinally aligned spaced apart nozzle type openings extending therealong with such openings being oriented relative to said carrying bars to spray water outwardly of the pipe in a direction rearwardly of said vehicle to avoid moistening the ground in the position of said wheels rotatively mounted to said front end.

2. The irrigation vehicle as set forth in claim 1 wherein said tubular frame is further characterized by:
   said back end being generally of an inverted U-shaped configuration having an arcuate bight portion and parallel vertical upright portions;
   said front end being generally of an inverted U-shaped configuration having vertical upright portion and a horizontal top member portion;
   a pair of vertically spaced apart horizontally extending side members interconnecting one of said back end upright portions to an associated one of said front end upright portions; and
   a pair of vertically spaced apart horizontally disposed side frame members interconnecting the other of said back end upright portions to the other of said front end upright portions.

3. The irrigation vehicle as set forth in claim 2 further characterized by:
   a pair of inverted U-shaped brackets each having their bight portions swivelly connected to a bottom end of one said back end vertical uprights with said leg portions extending downwardly therefrom;
   a pin traversing the distance between said leg portion and connected to said leg portions; and
   said rear wheels being rotatively mounted about the axis of said pin to be swivelly connected to said back end by said brackets.

4. The irrigation vehicle as set forth in claim 3 further characterized by:
   a pair of axially aligned horizontally disposed spaced apart shafts each rotatively affixed to a bottom end of one of said front end vertical uprights and projecting outwardly therefrom normal to the direction of travel of said vehicle;
   a pulley affixed concentrically to an inner end of each of said shafts;

said front wheels affixed to an associated outer end of each one of said shafts;

said motor being mounted to said top member of said front end;

said motor shaft extending outwardly from opposite ends of said motor and having their end portions journaled for rotation in said front end vertical uprights;

a pair of drive pulleys, each drive pulley mounted concentric with one of said motor shafts centrally thereof and disposed in vertical alignment with a front wheel pulley disposed immediately therebeneath; and a pair of resilient flexible drive belts, each drive belt trained about one of said drive pulleys and an associated wheel pulley for drivingly connecting said wheels to said motor.

5. The irrigation vehicle as set forth in claim 4 further characterized by:

said carrying bar being disposed horizontally extending an equal distance outwardly from each of said front end vertical uprights and extending parallel to said top member and affixed centrally thereof;

each of said yokes including a U-shaped carrying member and a cylindrical stem projecting vertically downwardly from the bight portion of each carrying member;

a pair of cylindrical apertures disposed in opposite ends of said carrying bar, each aperture adapted to rotatively receive said yoke stem therein for swivelling connecting said yokes to said carrying bar.

* * * * *